US012688396B2

(12) United States Patent
Hansen et al.

(10) Patent No.: US 12,688,396 B2
(45) Date of Patent: Jul. 21, 2026

(54) DIVERSITY AWARE MEDIA CONTENT RECOMMENDATION

(71) Applicant: Spotify AB, Stockholm (SE)

(72) Inventors: Christian Hansen, Copenhagen (DK); Casper Hansen, Copenhagen (DK); Brian Christian Peter Brost, New York City, NY (US); Lucas Maystre, London (GB); Mounia Lalmas-Roelleke, Saffron Walden (GB); Rishabh Mehrotra, London (GB)

(73) Assignee: Spotify AB, Stockholm (SE)

(*) Notice: Subject to any disclaimer, the term of this patent is extended or adjusted under 35 U.S.C. 154(b) by 994 days.

(21) Appl. No.: 17/320,439

(22) Filed: May 14, 2021

(65) Prior Publication Data

US 2022/0012565 A1      Jan. 13, 2022

Related U.S. Application Data

(60) Provisional application No. 63/025,708, filed on May 15, 2020.

(51) Int. Cl.
| | |
|---|---|
| *G06N 3/044* | (2023.01) |
| *G06N 3/042* | (2023.01) |
| *G06N 3/0442* | (2023.01) |
| *G06N 3/045* | (2023.01) |
| *G06N 3/0499* | (2023.01) |
| *G06N 3/08* | (2023.01) |
| *G06N 3/092* | (2023.01) |

(52) U.S. Cl.
CPC ............. *G06N 3/042* (2023.01); *G06N 3/044* (2023.01); *G06N 3/08* (2013.01)

(58) Field of Classification Search
CPC ........ G06N 3/042; G06N 3/044; G06N 3/045; G06N 3/08
See application file for complete search history.

(56) References Cited

U.S. PATENT DOCUMENTS

| | | | | |
|---|---|---|---|---|
| 10,936,653 | B2 * | 3/2021 | Levy ..................... | G06F 16/639 |
| 2008/0201287 | A1 * | 8/2008 | Takeuchi ............... | G06Q 30/08 706/46 |
| 2016/0299906 | A1 | 10/2016 | Cartoon | |

(Continued)

OTHER PUBLICATIONS

Aipe et al., "Sentiment-Aware Recommendation System for Healthcare using Social Media" (Year: 2019).*

(Continued)

*Primary Examiner* — Kamran Afshar
*Assistant Examiner* — Steven Phung
(74) *Attorney, Agent, or Firm* — McDonnell Boehnen Hulbert & Berghoff LLP

(57) ABSTRACT

A reinforcement learning ranker can take into account previously-recommended media content items to produce a ranked list of media content items to recommend next. The ranker finds a policy that gives the probability of sampling a media content item given a state. The policy is learned such that it maximizes a reward. A reward function associated with the media content item can be defined with respect to whether the user finds the media content item relevant (likelihood that the user will like the media content item) and a diversity score of the media content item.

14 Claims, 10 Drawing Sheets

(56) References Cited

U.S. PATENT DOCUMENTS

| | | | |
|---|---|---|---|
| 2018/0052921 A1 | 2/2018 | DeGlopper et al. | |
| 2018/0341704 A1 | 11/2018 | Barkan | |
| 2018/0349492 A1* | 12/2018 | Levy | G06F 16/639 |
| 2019/0114687 A1* | 4/2019 | Krishnamurthy | G06Q 30/0282 |
| 2019/0369948 A1 | 12/2019 | Gibson | |
| 2021/0004682 A1* | 1/2021 | Gong | G06F 9/451 |
| 2021/0081758 A1* | 3/2021 | Zadorojniy | G06N 3/08 |

OTHER PUBLICATIONS

Bridge et al., "Sudden Death: A New Way to Compare Recommendation Diversification" (Year: 2019).*

Gatzioura et al., "A Hybrid Recommender System for Improving Automatic Playlist Continuation" (Year: 2019).*

Oh et al., "Novel Recommendation based on Personal Popularity Tendency" (Year: 2011).*

Price et al., "Pull-Based Casting of Media Content Items" (Year: 2017).*

Shih et al., "Automatic, Personalized, and Flexible Playlist Generation using Reinforcement Learning", Sep. 12, 2018, arXiv preprint arXiv:1809.04214 (Year: 2018).*

Price et al., "Pull-Based Casting of Media Content Items", Dec. 12, 2017, Technical Disclosure Commons (Year: 2017).*

Chen et al. "Top-K Off-Policy Correction for a REINFORCE Recommender System" WSDM, https://doi.org/10.1145/3289600.3290999, Feb. 2019, 9 pages.

Pei et al. "Value-aware Recommendation based on Reinforced Profit Maximization in E-commerce Systems," arXiv:1902.00851v1, 2019, 8 pages.

Zhao et al. "Deep Reinforcement Learning for Page-wise Recommendations," Association for Computing Machinery, 2018, 9 pages.

Zhao et al. "Recommendations with Negative Feedback via Pairwise Deep Reinforcement Learning," Association for Computing Machinery, 2018, 9 pages.

Zheng et al. "DRN: A Deep Reinforcement Learning Framework for News Recommendation," Track: Intelligent and Autonomous sytems on the web, 2018, 10 pages.

Wang et al. "Exploration in Interactive Personalized Music Recommendation: A Reinforcement Learning Approach," https://bigbird. comp.nus.edu.sg/m2ap/wordpress/wp-content/uploads/2016/01/a7-wang.pdf, 2014, 22 pages.

Ie et al. "SlateQ: A Tractable Decomposition for Reinforcement Learning with Recommendation Sets," Proceedings of the 28th International Joint Conference on Artificial Intelligence (IJCAI-19), 2019, 8 pages.

Anderson, et al., "Algorithmic Effects on the Diversity of Consumption on Spotify", The World Wide Web Conference (2020), Taipei, Taiwan, 11 pages.

Clarke et al., "Novelty and Diversity in Information Retrieval Evaluation", Proceedings of The 31 St Annual International ACM SIGIR Conference on Research and Development in Information Retrieval (SIGIR 2008), ACM, New York, NY, USA, 659-666 (2008).

Liebman et al., "DJ-MC: A reinforcement-learning agent for music playlist recommendation", Proceedings of the 2015 International Conference on Autonomous Agents and Multiagent Systems (International Foundation for Autonomous Agents and Multiagent Systems), 591-599 (2015).

Mehrotra et al., "Towards a fair marketplace: Counterfactual evaluation of the trade-off between relevance, fairness & satisfaction in recommendation systems", Proceedings of the 27th ACM International Conference on Information and Knowledge Management, ACM, 2243-2251 (2018).

Waller and Anderson, "Generalists and Specialists: Using Community Embeddings to Quantify Activity Diversity in Online Platforms", The World Wide Web Conference, ACM, 1954-1964 (2019), 36 pages.

Williams, Ronald, "Simple statistical gradient-following algorithms for connectionist reinforcement learning", Machine Learning 8, 229-256 (1992).

Zhou, et al., "The Impact of YouTube Recommendation System on Video Views", Proceedings of the 10th ACM SIGCOMM Conference on Internet Measurement, ACM, 404-410 (2010).

Sakai et al., Which Diversity Evaluation Measures are "Good"?, Session 7A: Relevance and Evaluation 1, SIGIR '19, Jul. 21-25, 2019, Paris, France, 10 pages (595-604).

Fleder and Hosanagar, Blockbuster Culture's Next Rise or Fall: The Impact of Recommender Systems on Sales Diversity, Management Science 55, 5, 697-712 (2009).

* cited by examiner

MEDIA-PLAYBACK DEVICE 100

USER INTERFACE 110

LOCATION-DETERMINING DEVICE 120

MEDIA-PLAYBACK DEVICE PROCESSING DEVICE(S) 122

MEDIA-PLAYBACK DEVICE MEMORY DEVICE 124

SOUND SENSING DEVICE 126

CONTENT OUTPUT DEVICE 128

NETWORK ACCESS DEVICE 130

MEDIA-PLAYBACK ENGINE 132

10

140

B

DIVERSITY AWARE MEDIA CONTENT RECOMMENDATION

CROSS-REFERENCE TO RELATED APPLICATION

This application claims the benefit of U.S. Provisional Application No. 63/025,708, filed on May 15, 2020, the disclosure of which is hereby incorporated by reference in its entirety.

BACKGROUND

Algorithmically-generated recommendations shape media content consumption on streaming platforms. A central problem is that in many recommender systems, it is not sufficient simply to return relevant items, instead many systems must account for multiple user intents and needs, in addition to possible redundancy in the content of the returned items. The term "diversity" has been used within the information retrieval context, where a list was considered diverse if the list contained items which had low similarity to each other. Such a ranked list is typically greedily built, with the score of each item being an interpolation of the expected relevance to the user, and the dissimilarity of the item to all previously recommended items in the list. Retrieving diverse documents has been recognized as an important challenge in information retrieval and for recommender systems. The problem of diversity in list recommendation has, more recently, received great interest in developing more advanced methods to ensure list diversity.

Related to diversity is the notion of fairness in recommendations. There, diversity is considered from the point of view of the recommended items (e.g., group fairness), where if the items can be considered to be part of a group, all groups must on average be represented in the final recommendation. This can be extended to marketplace settings, where multiple different stakeholders have requirements for the fairness of the recommendation. Thus, whereas diversity is often considered to be a user-centric concern, fairness can be item centric, as a fair ranking can give equal opportunity for the recommended items.

The interplay between recommender systems and diversity has risen to public awareness as part of the so-called "filter bubble" phenomenon. Research has focused on the effects of recommender systems on the diversity of consumption. One study of a movie recommender system used on a popular e-commerce web site found that the recommendations led to a decrease in sales diversity. Fleder and Hosanagar, *Blockbuster Culture's Next Rise or Fall: The Impact of Recommender Systems on Sales Diversity*, MANAGEMENT SCIENCE 55, 5, 697-712 (2009). By contrast, a study on the effect of recommendations on the YOUTUBE video platform was shown to lead to more diverse consumption. Zhou, et al., *The Impact of YouTube Recommendation System on Video Views*, PROCEEDINGS OF THE 10TH ACM SIGCOMM CONFERENCE ON INTERNET MEASUREMENT, ACM, 404-410 (2010). Finally, in the context of music, a strong relationship between consumption diversity and long-term platform metrics such as retention and conversion has been shown. Anderson, et al., Algorithmic Effects on the Diversity of Consumption on Spotify, The World Wide Web Conference (2020). Diversity in the art has encompassed a variety of definitions. In some studies, diversity was tied to embeddings in a Euclidean space and defined as a function of pairwise distances in that space. Waller and Anderson,

*Generalists and Specialists: Using Community Embeddings to Quantify Activity Diversity in Online Platforms*, THE WORLD WIDE WEB CONFERENCE, ACM, 1954-1964 (2019). Other definitions have also been used. Clarke, et al., *Novelty and Diversity in Information Retrieval Evaluation*, PROCEEDINGS OF THE 31ST ANNUAL INTERNATIONAL ACM SIGIR CONFERENCE ON RESEARCH AND DEVELOPMENT IN INFORMATION RETRIEVAL (SIGIR 2008), ACM, New York, NY, USA, 659-666 (2008); Mehrotra, et al. *Towards a fair marketplace: Counterfactual evaluation of the trade-off between relevance, fairness & satisfaction in recommendation systems*, PROCEEDINGS OF THE 27TH ACM INTERNATIONAL CONFERENCE ON INFORMATION AND KNOWLEDGEMANAGEMENT, ACM, 2243-2251 (2018); and Sakai and Zeng, *Which Diversity Evaluation Measures Are "Good"?*, SIGIR'19: PROCEEDINGS OF THE 42ND INTERNATIONAL ACM SIGIR CONFERENCE ON RESEARCH AND DEVELOPMENT IN INFORMATION RETRIEVAL (July 2019). Current music streaming services can incorporate variety in track selection using techniques such as is described in US 2018/0052921, which is hereby incorporated by reference in its entirety for any and all purposes. In that publication, "discovery tracks" (tracks that the user is unfamiliar with but likely to enjoy) are mixed in with familiar tracks. But traditional techniques typically do not take into consideration the sequential nature of music recommendation in a streaming music session (e.g., the techniques do not account for behavior of a user during a music streaming session) and do not incorporate diversity in initial track selection.

SUMMARY

Content providers, such as music streaming services, recommend content using recommendation algorithms. Traditionally, such recommendation algorithms are focused on producing recommendations that the user will like (i.e., the user will listen to the recommended song rather than skipping it). But such recommendation algorithms can be improved by not only producing recommendations that the user will like but also recommendations that are diverse. Diversity can relate to dissimilarity of a given track to others that the user has played recently or that the user is typically recommended. Diversity can also encompass dissimilarity of a track with respect to overall popularity on the streaming platform.

The technology disclosed herein relates to recommending diverse content. Disclosed implementations include a reinforcement learning ranker that takes into account previously-recommended tracks in a session to produce a ranked list of tracks to recommend next. The ranker finds a policy $\pi(t|s)$ that gives the probability of sampling a track t given state s, where track t is a track to potentially select for playback next (such a track can be referred to as a potential or prospective track). The policy $\pi$ is learned such that it maximizes a reward $R(t, s)$, which gives some reward for recommending track t at state s. The notation t can also correspond to track-level features (e.g., data regarding the track, such as genre, mood, etc.) that are concatenated with features derived from the user's previous listening sessions. The state s is a concatenation of tracks the user previously has been recommended in the listening session. A reward function associated with the track can be defined with respect to whether the user finds the track relevant (e.g., likelihood that the user will like the track) and a diversity score of the track, such as using the formula: $R(t, s) = r(t, u) - c + \alpha d(t, u) r(t, u)$, where t represents track features, s represents listening session features, u represents user features, c is a constant that ensures a negative reward is assigned to irrelevant tracks, α represents a weighting of a trade-off between relevance score and diversity, R(•) is the reward function, r(•) is a relevance function, d(•) is a diversity function.

In an example, there is a method for selecting a media content item. The method comprises: obtaining data describing feedback from previous content consumption sessions of a user account; obtaining data regarding media content items previously recommended during a current content consumption session of the user account; generating a score for a potential media content item with a reinforcement learning model based on: the data regarding media content items previously recommended during the current content consumption session of the user account; and the data describing feedback from the previous playback sessions of the user account; and selecting, for the user account, the potential media content item based on the score, wherein the reinforcement learning model applies a reward function that takes into account relevance and diversity.

In another example, there is a non-transitory computer-readable medium having instructions stored thereon. When executed by one or more processors, the instructions cause the one or more processors to: obtain data describing feedback from previous content consumption sessions of a user account; obtain data regarding media content items previously recommended during a current content consumption session of the user account; generate a score for a potential media content item with a reinforcement learning model based on: the data regarding media content items previously recommended during the current content consumption session of the user account; and the data describing feedback from the previous playback sessions of the user account; and select, for the user account, the potential media content item based on the score, wherein the reinforcement learning model applies a reward function that takes into account relevance and diversity.

Other implementations are also possible.

BRIEF DESCRIPTION OF THE DRAWINGS

The same number represents the same element or same type of element in all drawings.

DETAILED DESCRIPTION

Figure 1:
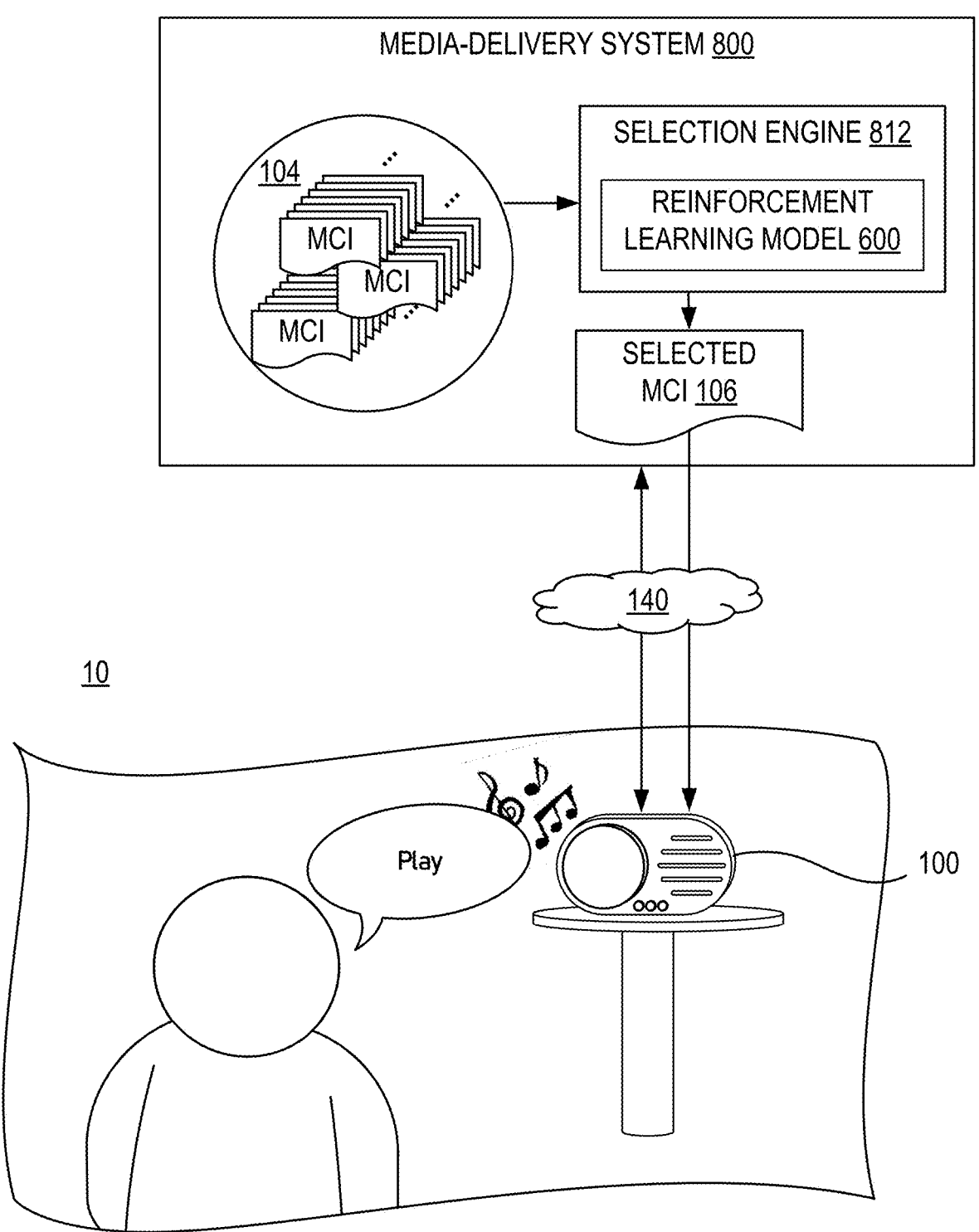
FIG. 1 illustrates an example media content item consumption system.

Disclosed examples can include techniques relating to sequential recommendations of single items. One or more of these techniques can be distinct from techniques regarding diversity and fairness in ranked lists. For example, in sequential recommendations the user is presented with each recommended item and then given the opportunity to consume or reject that item. Items introduced to satisfy diversity objectives cannot be as easily ignored by the user if such items turn out to be irrelevant or unwanted by the user, as can happen in the case of a ranked list. Diversity can facilitate exploration by helping users discover new content or inculcate new tastes. Additionally, diversity can help a media content platform spread consumption across different content creators and towards less-popular content, which can help counteract the rich-get-richer phenomena common in content consumption. Further, consumption of diverse content has been shown to improve user satisfaction. Thus, the techniques disclosed herein can provide improved recommendations to users. Such an improvement is an end in and of itself (e.g., by improving algorithms that produce recommendations) and can also improve efficiency of computing systems because fewer computing resources are wasted on providing low-quality recommendations.

An example of diversity is diversity in taste similarity (e.g., how similar a piece of music is to the type of music the user has historically streamed). Another example is diversity in popularity (e.g., how many users have recently streamed the piece of content). Based on these factors, diversity can be based on user bias of consumed content and can be based on global bias of consumed content. From the user bias perspective, diversity can be achieved by avoiding recommending similar content to what the user has historically streamed, while in the global bias, consumption can be shifted towards the long tail of consumed content.

With these notions of diversity, different methods of incorporating diversity on a streaming platform can be implemented. Different approaches of quantifying and promoting diversity can lead to different tradeoffs. Performance gains can be achieved via different modeling choices, which can affect practical system design decisions. Disclosed examples can include multiple different recommendation approaches. Examples include techniques for explicitly encoding diversity in the modeling process, such as by using approaches based on interleaving, submodularity, interpolation, and reinforcement learning reward modeling.

Disclosed examples can be based on sequential recommendations and can be achieved using different types of sequential recommenders, or rankers, of increasing complexity. There can be interplay between modelling complexity and performance, as well as how such recommends interact with diversity. Example recommenders can include similarity-based recommends and feed-forward neural rankers. Further recommenders include a feedback aware neural attention ranker and a reinforcement learning based ranker. Different recommenders can perform differently in terms of diversity when trained on user satisfaction objectives. Going beyond user satisfaction centric rankers, different techniques of incorporating diversity in recommendation models can include: (1) linear interpolation, (2) submodular diversification, (3) interleaving based, and (4) reward modeling based on reinforcement learning ranker.

Among the different diversification techniques, a reward modeling approach for reinforcement learning model can obtain a beneficial tradeoff between a high satisfaction metric while succeeding in surfacing diverse content. Experiments indicate that, for diversity with respect to a user's listening history, a reinforcement learning approach performs comparably to the interpolation strategy, with the interpolation strategy offering a wider range of trade-off and subsequently more control over consumption. Comparing these results with the ranker comparison on only satisfaction, bigger differences in satisfaction metrics when rankers consider diversity, than when they are only focused on satisfaction, can be observed. There can be a tension between optimizing recommendation models for satisfaction-centric objectives versus diversity goals. While developing better rankers results in increasing short-term user satisfaction, such models tend to serve less diverse recommendations. Experimental results suggest that when one cares only about satisfaction, there exist small difference between different recommender systems, but when one cares additionally about diversity, the difference between rankers becomes more pronounced. Given the varying complexity of development and deployment of these rankers, this result has significant ramifications on the choice of rankers for system designers based on the task at hand.

While disclosed techniques can be applied to any of a variety of different kinds of content, for simplicity and ease of understanding many examples herein will be discussed in the music context. Algorithmic recommendations can be used to drive diversity in music consumption. Given the sequential nature of music consumption wherein the user sequentially decides to stream or skip the recommended music, it is not straightforward to recommend a track solely for the purpose of increasing diversity, especially if the track has a low chance of being listened to (e.g., a high chance of being skipped by the user). Given this complex interplay between relevance of music to the user, its popularity and the resulting success of diversification, it becomes important to carefully understand the relationship between such concepts, to develop algorithmic diversification techniques. Diversity can be examined through the lens of user-track similarity and popularity. In other words, while there can be numerous ways of defining and quantifying diversity, example techniques include notions of diversity based on user-track similarity and popularity.

User-track similarity can relate to diversity of recommended content based on user's listening habits. Most recommender systems trained on historic user activity tend to recommend similar content to what the user previously consumed. By contrast, disclosed techniques can be used to reduce an average user-track similarity of tracks recommended to users. User-track similarity can be calculated as a cosine similarity between a user embedding and a track embedding, where the user embedding encodes information from tracks that the user previously consumed.

Another measure of diversity can be based on popularity and can be used to reduce the popularity bias prevalent in recommender systems. Many recommendation systems tend to often recommend the most popular items, corresponding to a "winner takes all" mentality. This can harm the user experience, as users are not being exposed to diverse content. Similarly, this tendency also harms content providers (e.g., artists) that have yet to build a large fan base. Thus, by diversifying recommended music based on popularity, techniques can expose more tail-centric recommendations and reduce the average popularity metric of the tracks recommended.

These notions of diversity can be expressed as d (t, u), where t corresponds to a track and u corresponds to a particular user. High diversity can correspond to low popularity and low user-track similarity. Popularity can be a track-level diversity score that is user independent (e.g., $d_{track}(t, u) = d_{track}(t, u')$), thus aiming to reduce popularity can make an entire range of tracks less appealing to recommend. By contrast, user-track similarity is inherently tied to a particular user (e.g., $d_{user\text{-}track}(t, u) \neq d_{user\text{-}track}(t, u')$). These notions of diversity can be different from those often applied in set recommendations, which are often of the form d(t, t'), such that diversity is defined between different items (e.g., t and t') in a recommended set.

Sequential Recommendation and Diversity

During sequential recommendation in a session, a user consumes a series of recommended content items. In this setting, users can either skip or listen to a content item. A skipped content item can be considered as irrelevant, and a consumed content item can be considered relevant. An example session can start with a user selecting a playlist or radio, that includes tracks with some thematic overlap (e.g., jazz songs or happy songs). The user is then recommended a series of tracks until the user chooses to end the session. There can be different recommendation scenarios. In a first scenario, a system can aim to recommend the tracks that a user is most likely to enjoy using different rankers. In another scenario, a system can aim to recommend tracks the user is likely to enjoy and with a secondary objective of track diversity. Different methods can be used to optimize the trade-off between making both relevant and diverse recommendations.

Rankers can produce recommendations based on different features. Example feature types, features, and descriptions are shown in Table I below:

TABLE I

| Type | Feature | Description |
| --- | --- | --- |
| User | Embedding | Forty-dimensional learned WORD2VEC vector of the user |
| | Country | Country of registration for the user |
| Track | Embedding | Forty-dimensional learned WORD2VEC vector of the track |
| | Popularity | Normalized popularity of the track |
| | Genres | Genres relevant to the track |
| | Acoustic | Sixteen derived acoustic features |
| | Track length | Track duration in sections |
| User-track | Similarity | Cosine similarity between user and track embeddings |
| | Distance | Euclidian distance between user and track embeddings |
| | Genre affinity | Affinity for highest overlapping genre between user and track |
| Playlist | Playlist ID | A unique playlist identifier used for learning embeddings |

For example, where the content items are audio tracks, each track can be represented as a concatenation of three distinct feature vectors: a contextual vector, an acoustic vector, and a statistic vector. The contextual vector can be a forty-dimensional real-valued vector, which is trained such that two tracks that occur in the same context, will be proximate each other in the vector space. The acoustic vector can include sixteen derived features that reflect different acoustic features of the track (e.g., loudness).

Lastly, the statistics vector can include information on the track length and popularity of the track on the platform.

Each user can be represented as a weighted average of the contextual vectors of the tracks the user has played in the past. The similarity between a track and a user can be computed by taking the cosine similarity between the user vector and the track contextual vector, as they reside in the same space.

For each user and track pair, there can be a number of derived features capturing their relations. The cosine similarity and Euclidean distance between the user and track can be computed and used as a feature. Additionally, each user can have an affinity for genres, which can be used as a feature by taking the maximum affinity within the track's genres. Each playlist can be represented with a unique identifier, which can be used by some of the ranking models disclosed herein for learning playlist-specific embeddings during model training. The features can be grouped into, for example, (1) track-level features that can be the combination of the track and user-track features and (2) session-level meta features that are the combination of the playlist embedding and user features. Other groupings are also possible.

Cosine rankers can use a cosine distance between a track's contextual embedding, $e_{track} \in R^{40}$ (e.g., the embedding of the track, $e_{track}$, within a forty-dimensional space), and a user's contextual embedding $e_{user} \in R^{40}$: $score_{cosine}=cosine(e_{track}, e_{user})$. A high cosine score can indicate that the track is similar to tracks the user previously consumed on the platform.

A feed forward ranker can be a neural feed forward network that takes the track-level features and session-level meta features as input. The features can be concatenated, and the network can give a score for a single track: $score_{FF}=FF_{\sigma}(FF_{relu}(FF_{relu}(T; M)))$, where FF stands for feed forward, relu is the rectified linear unit, and $\sigma$ is the sigmoid function. The embedding for the playlist is learned by the network during training. The feed forward network can include multiple (e.g., two) hidden layers with relu activation functions, and a prediction layer using a sigmoid activation function. The prediction can correspond to the probability of a user skipping a track, which can be optimized using cross entropy loss. Feed forward rankers can be relatively simple and computationally efficient. Such techniques can be used without considering the user's history directly, though the network can be indirectly aware of the user's history through the user embedding and the user-track features.

Where neural rankers are used, they can be tuned using any of a variety of techniques. In an example, neural rankers can be tuned by choosing the batch sizes within {128, 256, 512}, and learning rate from {0.001, 0.0005, 0.0001}. Hidden layers can be fixed to 50 neurons. LSTM sizes of 50 can be used. For the feed forward and feedback aware rankers, a batch size of 256 and learning rate of 0.0005 can be used. For the reinforcement learning ranker, a batch size of 512 and learning rate of 0.0001 can be used. For the training the reinforcement learning ranker, logged data can be used. In addition or instead, propensity scores can be used to allow for off-policy techniques.

Feedback Aware Ranker

A feedback aware ranker can extend the feed forward ranker described above to incorporate the user's previous sessions to compute a dynamic user embedding that is used for ranking. While the two previous models gave a score based on a single track, the feedback aware ranker can take the user's history as input. The dynamic user embedding can be calculated in two parts. First a single session can be summarized and then multiple sessions can be summarized to calculate a dynamic user embedding.

Regarding summarizing a single session, each session (s) can include session-level meta features (M) and a sequence of tracks (T, R) $\in$ s, where T is the track level features and R is an indicator whether the user found the track relevant (e.g., whether the user skipped the track or listened to the track). The session can be summarized using a long short-term memory (LSTM) system followed by an attention layer defined as:

$$S = ATTN(FF_{lin}(LSTM(S \mid LSTM_{init}))), \text{ where } LSTM_{init} = FF_{lin}(M).$$

$LSTM_{init}$ can be the initial state of the LSTM cell. LSTM can denote the LSTM that runs over the whole sequence s. ATTN is an attention module, which can be a weighted sum of the transformed LSTM outputs, where each weight is a learned softmax normalized scalar dependent on the transformed LSTM output. The LSTM cell can be initialized by the session meta information such that the session representation can be user and playlist dependent.

Regarding dynamic user embedding, users can have multiple previous sessions, each having a representation. To obtain the final dynamic user embedding, the session representations can be summarized using an attention mechanism. The attention mechanism can be a weighted sum over the session representations, where each weight is a learned softmax normalized scalar. The scalar can be computed by a single feed forward layer taking as input the session representation and an interaction vector. The interaction vector can be the concatenation, subtraction, and multiplication of the past session and current session meta representations. The interaction vector can be configured to represent the representational changes between the playlists, so the importance of a past session for the current dynamic user embedding can depend on how similar the past and current playlists are.

The feedback aware track score can be computed similarly to the feed forward ranker, with the dynamic user embedding (DU) as an additional input:

$$score_{FA} = FF_{\sigma}(FF_{relu}(FF_{relu}(T; M; DU))),$$

where FA stands for feedback aware. Similar to the feed forward ranker, this model can be optimized using cross entropy loss. The dynamic user embedding can be precomputed to enhance the computational efficiency. This pre-computation can be based on determining which playlist a user is likely to consume.

Example Implementation

FIG. 1 illustrates an example media content item consumption system 10. The system 10 includes a media-delivery system 800 that can provide one or more media content items 104 to a media-playback device 100 for consumption by a user via a network 140.

A media content item 104 is an item of media content (e.g., audio, visual, or other types of media content) that may be stored in any format suitable for storing media content. Non-limiting examples of media content items include songs, albums, audiobooks, music videos, movies, television episodes, podcasts, other types of audio or video content, and portions or combinations thereof. In some examples, media content items 104 can further include textual content and interactive content. For ease of understanding, reference will be made herein to tracks as an example kind of media content items 104. Tracks are audio recordings. Typically the audio recordings are a recording of a piece music (e.g., a song), but tracks can further include, for example, podcasts or audiobooks.

The media-delivery system 800 can include a selection engine 812 configured to select, from a pool of possible media content items 104, a selected media content item 106. The selection engine 812 can be or include a recommender or ranker as described elsewhere herein. The selection engine 812 can select the selected media content item 106 using a reinforcement learning model 600.

Additional details regarding the media-delivery system and media-playback device 100 are provided in FIG. 8. Additional details regarding the reinforcement learning model 600 are described in FIG. 6.

The media-delivery system 800 can cooperate with the media-playback device 100 to provide media playback sessions. Such sessions can be associated with a variety of different kinds of data and are described in more detail in FIG. 2.

Example Session

Figure 2:
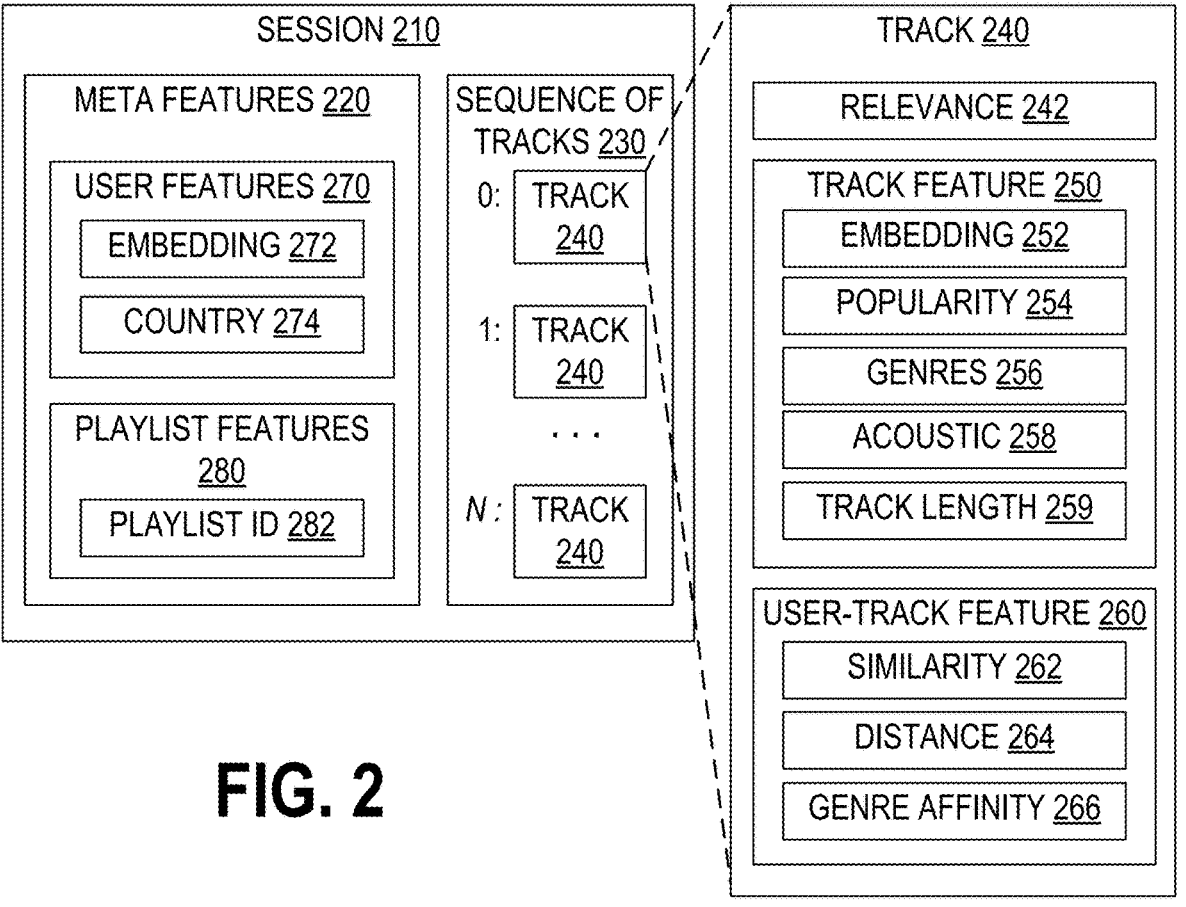
FIG. 2 illustrates an example session.

FIG. 2 illustrates an example session 210. The session 210 can be associated with meta features 220 and a sequence of tracks 230.

The meta features 220 can include user features 270 and playlist features 280.

The user features can include an embedding feature 272 and a country feature 274. For example, as described above, the embedding feature 272 can be a learned vector of the user, such as a forty-dimensional learned WORD2VEC vector of the user. The country feature 274 can be an indication of the country of registration of the user.

The playlist features 280 can include a playlist identifier 282. For example, the playlist identifier 282 can be a unique playlist identifier used for learning embeddings.

The sequence of tracks 230 can be a sequence of one or more tracks 240.

Each track 240 can be associated with a relevance 242, track features 250, and user-track features 260.

The track features 250 can include an embedding feature 252, a popularity feature 254, genres feature 256, acoustic features 258, and track length feature 259. The embedding feature 252 can be a multi-dimensional learned vector of the track, such as a forty-dimensional learned WORD2VEC vector of the track. The popularity feature 254 can be a feature indicating a popularity of the track, such as a normalized popularity of the track. The genres feature 256 can be a feature indicating the one or more genres relevant to the track. The track length feature 259 can be an indication of the duration of the track (e.g., in seconds).

The acoustic features 258 can be one or more acoustic features of the track, such as sixteen derived acoustic features. Acoustic features 258 can include features related to or describing, for example, temporal information or spectral information. Temporal information can include tempo, rhythm, beats, downbeats, tatums, patterns, sections, or other structures. Spectral information can include melody, pitch, harmony, timbre, chroma, loudness, vocalness, or other possible features. The acoustic features can be derived from analysis of the track and can refer to a numerical or mathematical representation of the sound of a track. Acoustic features may take the form of one or more vectors, matrices, lists, tables, and other data structures. Acoustic features may be derived from analysis of the music signal. One form of acoustic feature, commonly termed an acoustic fingerprint, may uniquely identify a specific track. Other forms of acoustic features may be formed by compressing the content of a track while retaining some or all of its musical characteristics.

The user-track features 260 can include a similarity feature 262, a distance feature 264, and a genre affinity feature 266. The similarity feature 262 can include a cosine similarity between user and track embeddings. The distance feature 264 can include a Euclidian distance between user and track embeddings. The genre affinity feature 266 can include an affinity value for highest-overlapping genre between user and track.

In some examples, the tracks can be associated with metadata which can be part of or in addition to the features described above. Metadata can provide various information associated with the track or an associated media context. In some embodiments, the metadata includes one or more of title, artist name, album name, length, genre, mood, and era, among other data. In some embodiments, the metadata includes acoustic metadata, cultural metadata, and explicit metadata. The cultural metadata can refer to text-based information describing listeners' reactions to a track or song, such as styles, genres, moods, themes, similar artists and/or songs, rankings, etc. Cultural metadata may be derived from expert opinion such as music reviews or classification of music into genres. Cultural metadata may be derived from listeners through websites, chatrooms, blogs, surveys, and the like. Cultural metadata may include sales data, shared collections, lists of favorite songs, and any text information that may be used to describe, rank, or interpret music. Cultural metadata can be generated by a community of listeners and automatically retrieved from Internet sites, chat rooms, blogs, and the like. Cultural metadata can take the form of one or more vectors, matrices, lists, tables, and other data structures. A form of cultural metadata that can be useful for comparing music is a description vector. A description vector is a multi-dimensional vector associated with a track, album, or artist. Each term of the description vector indicates the probability that a corresponding word or phrase would be used to describe the associated track, album or artist. In some examples, the cultural metadata can be used to determine diversity. The explicit metadata can refer to factual or explicit information relating to the track. Explicit metadata may include album and song titles, artist and composer names, other credits, album cover art, publisher name and product number, and other information. Explicit metadata is generally not derived from the music itself or from the reactions or opinions of listeners. At least some of the metadata, such as explicit metadata and cultural metadata, for a large library of songs or tracks can be evaluated and provided by one or more third party service providers. Acoustic and cultural metadata can take the form of parameters, lists, matrices, vectors, and other data structures. Acoustic and cultural metadata may be stored as XML files, for example, or any other appropriate file type. Explicit metadata may include numerical, text, pictorial, and other information. Explicit metadata may also be stored in an XML file or other file format. All or portions of the metadata may be stored in separate files associated with specific tracks. All or portions of the metadata, such as acoustic fingerprints and/or description vectors, may be stored in a searchable data structure, such as a k-D tree or other database format.

Figure 3:
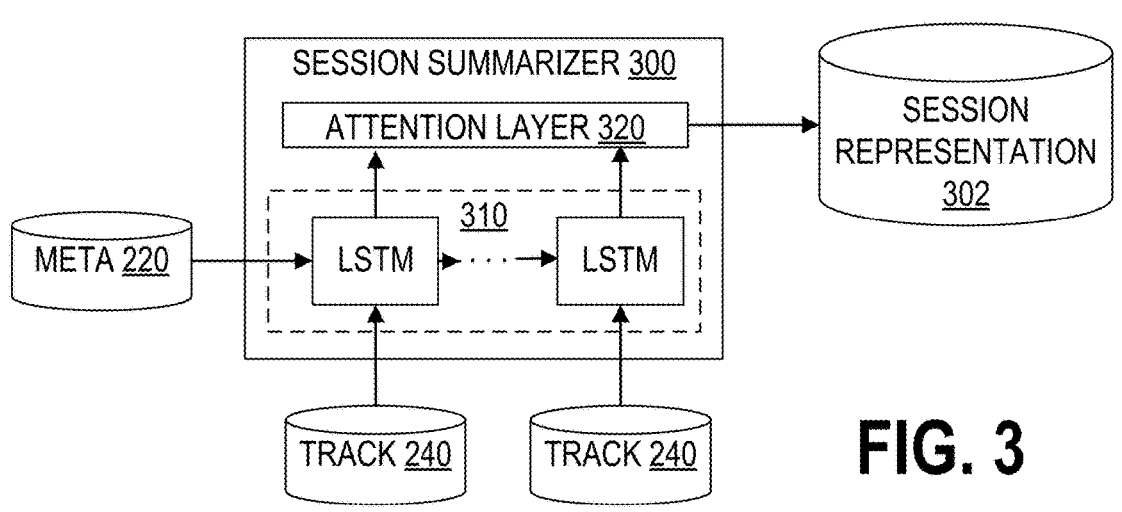
FIG. 3 illustrates a session summarizer.

FIG. 3 illustrates a session summarizer 300. The session summarizer 300 can be configured to summarize a session 210 to produce a session representation 302 as output. The session summarizer 300 can include an LSTM layer 310 and an attention layer 320. The attention layer 320 can be a weighted sum of transformed output from the LSTM layer 310. The LSTM layer 310 can take, as input, the individual tracks of the session 210 and the meta features 220.

Figure 4:
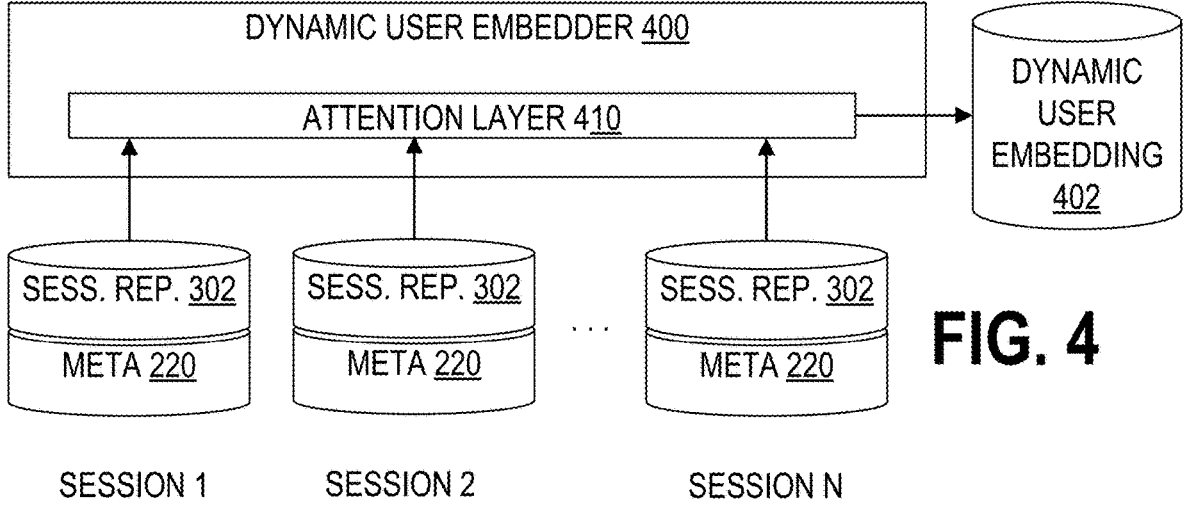
FIG. 4 illustrates an example dynamic user embedder.

FIG. 4 illustrates an example dynamic user embedder 400. The dynamic user embedder 400 can be configured to produce a dynamic user embedding 402. The dynamic user embedder 400 can include an attention layer 410 that receives session representations 302 and meta features 220 as input for each of a plurality of sessions and then produces, as output, the dynamic user embedding 402. The attention layer 410 can be a weighted sum over the session representations 302 and associated meta features 220. Each weight can be a learned softmax normalized scalar. The scalar can be computed by a single feed forward layer taking as input the session representation 302 and an interaction vector. The interaction vector can be the concatenation, subtraction, and multiplication of the past session and current session meta representations.

Figure 5:
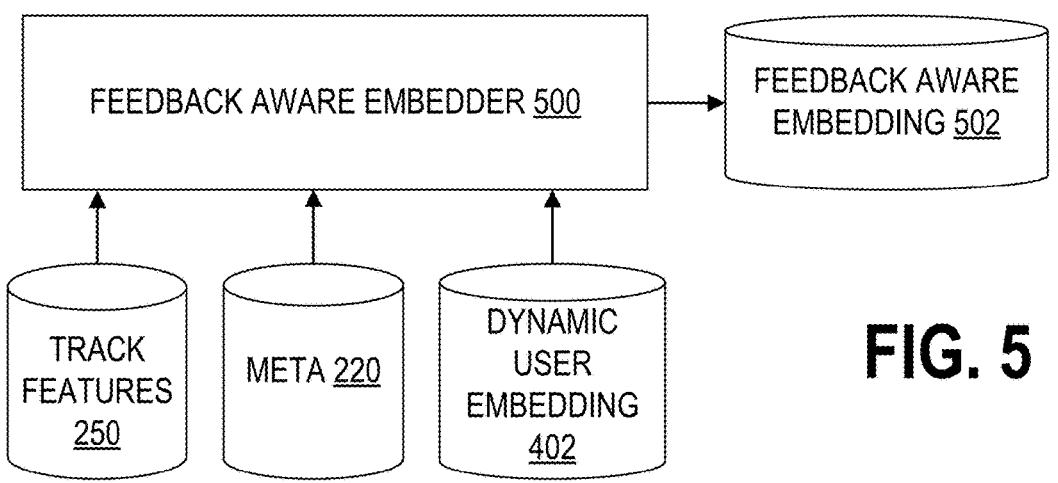
FIG. 5 illustrates a feedback aware embedder.

FIG. 5 illustrates a feedback aware embedder 500. The feedback aware embedder 500 can take track features 250, meta features 220, and a dynamic user embedding 402 as input and produce, as output, a feedback aware embedding 502. In an example, the feedback aware embedder calculates the feedback aware embedding 502 via: $FF_\sigma(FF_{relu}(FF_{relu}(T; M; DU)))$, where FF stands for feed-forward, relu is a rectified linear unit, and $\sigma$ is the sigmoid function.

Figure 6:
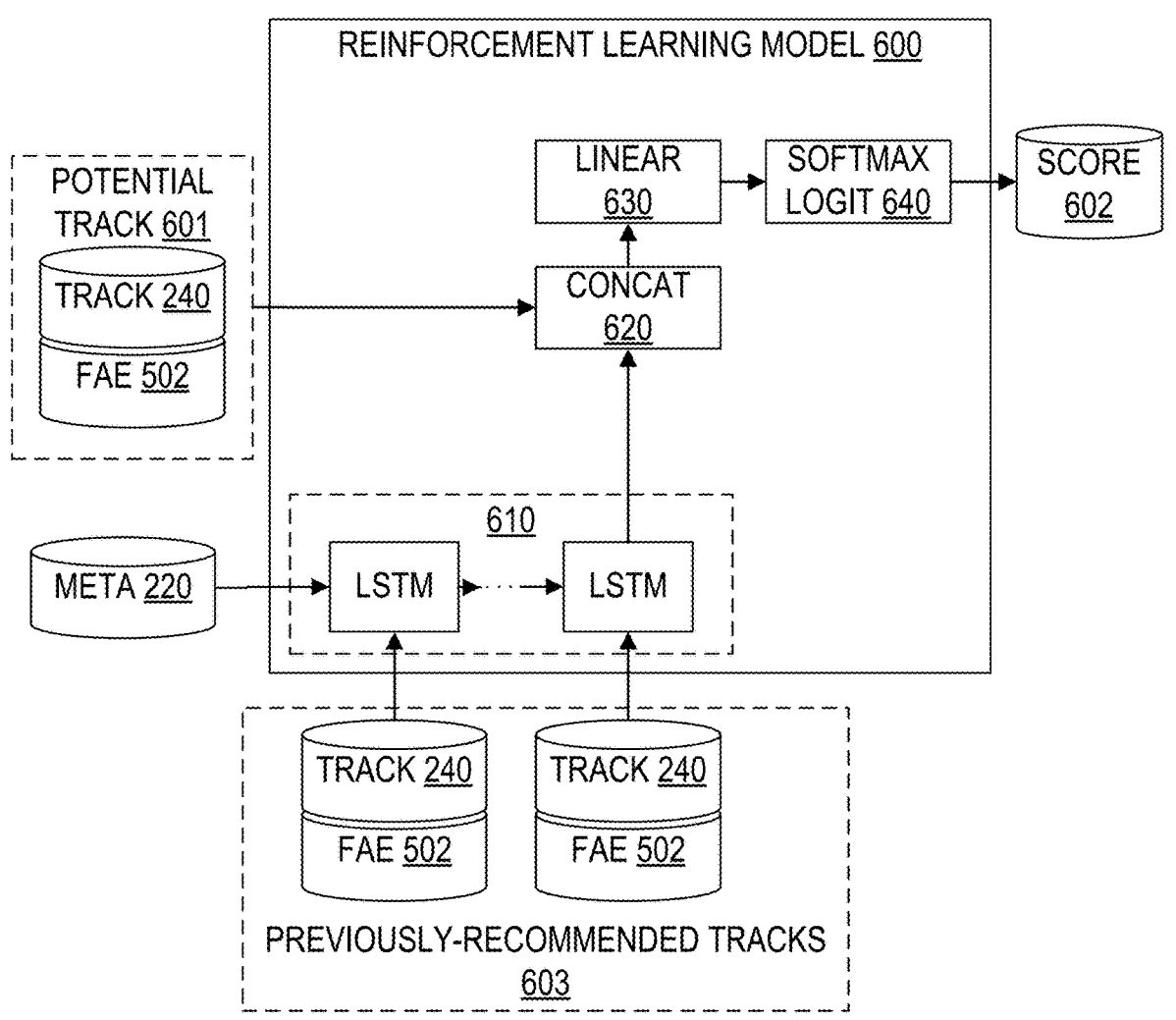
FIG. 6 illustrates a reinforcement learning model that produces a score for a potential track.

FIG. 6 illustrates a reinforcement learning model 600 that produces a score 602 for a potential track 601. The potential track 601 can be a track sampled from a set of potential tracks to recommend to a user. The score 602 can then be used to rank the tracks for selection and recommendation to a user for playback. The reinforcement learning model can include an LSTM layer 610, a concatenation function 620, a linear feed forward layer 630, and a softmax logit function 640.

The reinforcement learning model 600 can be a sampling-based ranker that samples a single potential track 601 from a set of potential tracks as the recommendation, which depends on previously-recommended tracks 603. This process can be repeated on the remaining set of possible tracks to produce a ranked list.

A policy $\pi(t|s)$ can be determined that gives the probability of sampling track t given state s. The policy $\pi$ is learned such that the policy maximizes a reward R(t, s), which gives a reward for recommending track t at state s.

The track t can be track 240. The track t can be concatenated with derived features from the feedback aware embedding 502. The feedback aware embedding 502 can be the second and last layer of the feedback aware ranker for each track 240. The feedback aware embeddings 502 be included to provide a richer representation to the reinforcement learning model 600, which incorporates the user's past feedback.

The state s can be a concatenation of tracks the user was previously recommended in the session, in addition to the session meta features 220.

The state can be encoded using a stacked LSTM layer 610 made of two layers, being initialed based on the session meta features 220: $s_{enc}=LSTM_2(s|LSTM_{init})$, where $LSTM_{init}=FF_{lin(M)}$. Here, $LSTM_2$ is a stacked LSTM, and s_enc is the last output of the stacked LSTM. The logit for each track in the set of possible tracks can be computed as: $logit=FF_{lin}(FF_{relu}(FF_{lin}(s_{enc}); FF_{lin}(t)))$. Both session encoding and track representation can be passed through a linear feed forward layer 630, then concatenated and run through a feed forward layer using a relu activation function, followed by a linear output that gives the unnormalized logit for the track. The unnormalized logit is computed for all tracks in the set of possible tracks, and the sample probability is found by applying a softmax.

The reward associated with a sampled track, $t\sim\pi(\bullet|s)$ is defined based on whether the user found the track relevant: R(t, s)=r(t, u)−c, where r is a binary relevance function. The binary relevance function can return 0 if the user skipped the track and otherwise return 1. The value c can be set to a small constant that ensures that a negative reward is assigned to non-relevant tracks. For experiments conducted by the inventors, the value of c was fixed at 0.1. The model can be trained using the REINFORCE algorithm as described in *Simple statistical gradient-following algorithms for connectionist reinforcement learning*, Machine learning 8, 3-4 (Williams, 1992), 229-256, which is hereby incorporated by reference in its entirety for any and all purposes.

Diversity

Various techniques can be used to determine diversity, such as linear interpolation, submodular, interleaving, and reinforcement learning.

Regarding linear interpolation, given the diversity function d(u, t) and score function s(u, t), the linear interpolation can be defined as Z: $s(u, t)_{diversify}=s(u, t)+\alpha d(u, t)$. Here, the coefficient $\alpha$ controls the trade-off between relevance score and diversity.

Regarding submodular, diversity can be introduced by formulating the diversity problem as a submodular set function. Submodular set functions uphold the following condition: $f(X \cup x)−f(X)\geq f(Y \cup x)−f(Y)$, $X \in Y$, where X and Y are sets of items, x is a single item, and $f$ is some real valued function that takes as argument a set. This condition states that a submodular function has diminishing return when adding new items to the set. Submodular functions have been used to provide diversity in recommendations as they fit naturally when the set of recommended items should be diverse regarding some similarity metric between the items. But notions of diversity herein need not be naturally submodular, such as where diversity is a property of either the track itself or the user-track interaction, and thus do not have diminishing returns. But such notions of diversity can be made submodular, by changing the task to recommend tracks of varying diversity. For example, given a set of recommended tracks $\tau$ for user u, $f$ can be defined as:

$$f(\tau, u) = \sum_{t \in \tau} s(u, t) + \frac{\alpha}{|\tau|} \sum_{t' \in \frac{\tau}{t}} abs(d(u, t) = d(u, t')),$$

where $|\tau|$ is the size of set $\tau$, and abs is the absolute value. In this setting, tracks can be recommended with highest relevance scores for a given user that have as different diversity scores as possible as this maximizes the distance. This problem is NP-had but can be solved greedily to obtain a near optimal solution.

Regarding interleaving, diversity can be introduced by alternatively recommending tracks with high diversity and high relevance scores. To do this the tracks are sorted into two lists, $l_{score}$ and $l_{diversity}$, and sample with probability 1−$\alpha$ from the score list and otherwise from the diversity list at each time step, where $\alpha$ controls the trade-off between relevance and diversity. After each recommendation, the recommended track is removed from both lists.

Reinforcement learning permits the optimization of multiple objectives directly by modifying the reward function. Diversity can be incorporated into the reward function. In an example, the reward function can be implemented as: R(t, s)=r(t, u)=c+αd(t, u)r(t, u), where α is a trade-off parameter between diversity and relevance. Diversity is multiplied with relevance such that it is only beneficial to recommend diverse tracks when they are beneficial to the user.

The inventors undertook an experiment related to how the different rankers and diversity methods presented fare in terms of key satisfaction and diversity metrics. The results of the experiment are shown in the last section herein.

Method

Figure 7:
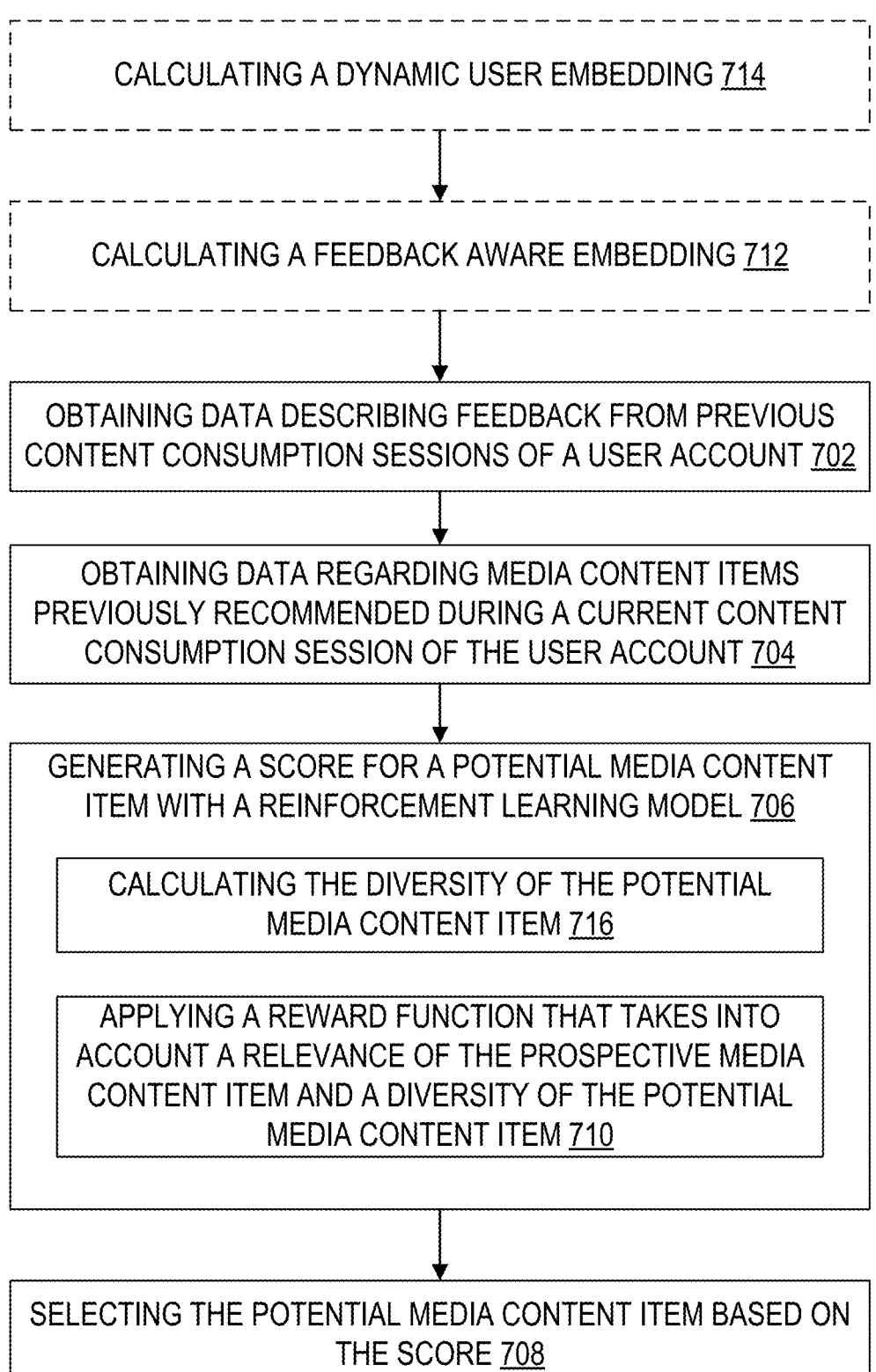
FIG. 7 shows a method that can include various operations.

FIG. 7 shows a method 700 that can include various operations. In some examples, the operation can begin with operation 702.

Operation 702 can include obtaining data describing feedback from previous content consumption sessions of a user account. Following operation 702, the flow of the method 700 can move to operation 704.

Operation 704 can include obtaining data regarding media content items previously recommended during a current content consumption session of the user account. Following operation 704, the flow of the method 700 can move to operation 706.

Operation 706 can include generating a score 602 for a potential media content item with a reinforcement learning model. The generating can be based on the data regarding media content items previously recommended during the current content consumption session of the user account and the data describing feedback from the previous playback sessions of the user account. Following operation 706, the flow of the method 700 can move to operation 708.

Operation 708 can include selecting, for the user account, the potential track based on the score.

In some examples, the operation 706 can include operation 710. Operation 710 can include applying a reward function that takes into account a relevance of the prospective media content item and a diversity of the potential media content item.

In some examples, the method 700 can include operation 712. Operation 712 can include calculating a feedback aware embedding 502 with the feedback aware embedder 500 based on a meta feature 220, a track 240, and a dynamic user embedding 402.

Operation 714 can include calculating the dynamic user embedding 402 with a dynamic user embedder 400 based on representations of prior media consumption sessions.

Operation 716 can include calculating diversity of the potential media content item. In some examples, calculating the diversity of the potential media content item can be based on a popularity of the potential media content item. In some examples, calculating the diversity of the potential media content item can be based on a similarity of the potential media content item to other tracks played by the user account.

System

Figure 8A:
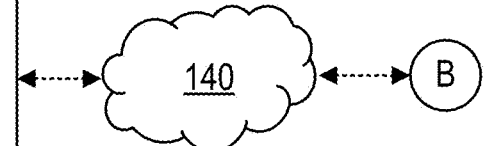
FIG. 8, which is made up of FIG. 8A and FIG. 8B, illustrates an example implementation of the media content item consumption system.
Figure 8B:
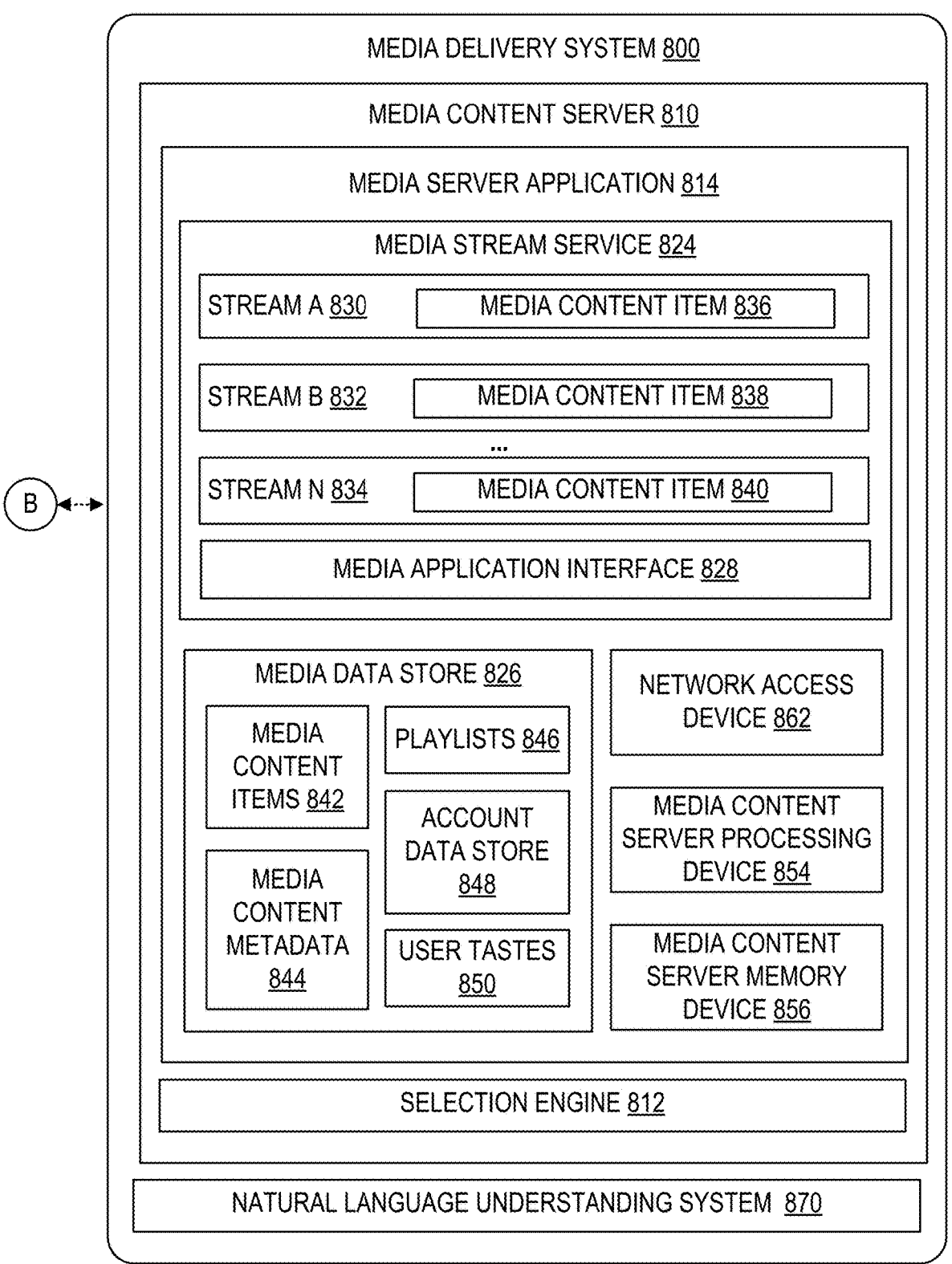

FIG. 8, which is made up of FIG. 8A and FIG. 8B, illustrates an example implementation of the media content item consumption system 10. The system 10 illustrates the media-playback device 100 and the media-delivery system 800 connected over the network 140.

Media-Playback Device

The media-playback device 100 is a computing device able to play media content items (e.g., produce visual or audio output) for a user. In some examples, the media content items are provided by the media-delivery system 800 and transmitted to the media-playback device 100 using the network 140. In examples, the media-playback device 100 is a handheld entertainment device, smartphone, tablet, watch, wearable device, or any other type of device capable of playing media content. In yet other examples, the media-playback device 100 is a media playback appliance, such as an in-dash vehicle head unit, an aftermarket vehicle media playback appliance, a smart assistant device, a smart home device, a virtual reality device, an augmented reality device, a television, a gaming console, a set-top box, a network appliance, a BLU-RAY disc player, a DVD player, a media player, a stereo system, smart speaker, an Internet-of-things device, or a radio, among other devices or systems.

The media-playback device 100 plays media content items for a user. The media content items are selectable for playback with user input. The media content items can also selectable for playback or selection by a user without user input, such as by the media-playback device 100 or the media-delivery system 800. In an example, the media content items are selected for playback by the selection engine 812 of the media-delivery system 800.

In some examples, the media-playback device 100 plays media content items that are provided (e.g., streamed) by a system external to the media-playback device 100, such as the media-delivery system 800, another system, or a peer device. In addition or instead, in some examples, the media-playback device 100 plays media content items stored locally on the media-playback device 100. Further, in at least some examples, the media-playback device 100 plays media content items that are stored locally as well as media content items provided by other systems, such as the media-delivery system 800.

The media-playback device 100 selects and plays media content items and generates interfaces for controlling playback of the media content items. In some examples, the media-playback device 100 receives user input over the user interface 110, such as a touch screen user interface, an utterance-based user interface, tactile user interfaces, virtual user interfaces, other user interfaces, or combinations thereof, and the media-playback device 100 plays a media content item based thereon. The media-playback device 100 can include other input mechanisms including but not limited to a keypad and/or a cursor control device. The keypad receives alphanumeric characters and/or other key information. The cursor control device includes, for example, a handheld controller, a mouse, a rotary input mechanism, a trackball, a stylus, and/or cursor direction keys.

In some examples, the user interface 110 includes a touch-screen-based user interface. A touch screen operates to receive an input from a selector (e.g., a finger, stylus, etc.) controlled by the user. In some examples, the touch screen operates as both a display device and a user input device. In some examples, the user interface 110 detects inputs based on one or both of touches and near touches. In some examples, the touch screen displays a user interface for interacting with the media-playback device 100. Some examples of the media-playback device 100 do not include a touch screen.

While some examples of the media-playback device 100 do not include a display device, where α media-playback device 100 does include a display device, the media-playback device 100 will often include a graphics subsystem and coupled to an output display. The output display uses various technologies, such as TFT (Thin Film Transistor), TFD (Thin Film Diode), OLED (Organic Light-Emitting Diode), AMOLED (active-matrix organic light-emitting diode) display, and/or liquid crystal display (LCD)-type displays. The displays can also be touch screen displays, such as capacitive and resistive-type touch screen displays.

Examples of the user interface 110 include input control devices that control the operation and various functions of the media-playback device 100. Input control devices include any components, circuitry, or logic operative to drive the functionality of the media-playback device 100. For example, input control device(s) include one or more processors acting under the control of an application.

In some examples, the media-playback device 100 includes one or more location-determining devices 120, media-playback device processing devices 122, and a media-playback device memory device 124. In an example, the media-playback device 100 includes a content output device 128. In an example, the media-playback device 100 includes a movement-detecting device. In an example, the media-playback device 100 includes a network access device 130. In an example, the media-playback device 100 includes a sound-sensing device 126. Other examples may include additional, different, or fewer components.

The location-determining device 120 is a device that determines the location of the media-playback device 100. In some examples, the location-determining device 120 uses one or more of the following technologies: Global Positioning System (GPS) technology that receives GPS signals from satellites, cellular triangulation technology, network-based location identification technology, WI-FI® positioning systems technology, ultrasonic positioning systems technology, and combinations thereof. Examples of the location-determining device 120 further include altitude- or elevation-determining devices, such as barometers.

The one or more media-playback device processing devices 122 include one or more processing units, such as central processing units (CPU), digital signal processors, and field-programmable gate arrays, among others.

The media-playback device memory device 124 operates to store data and instructions. In some examples, the media-playback device memory device 124 stores instructions to perform one or more operations described herein. Some examples of the media-playback device memory device 124 also include a media content cache. The media content cache stores media content items, such as media content items that have been previously received from the media-delivery system 800. The media content items stored in the media content cache are storable in an encrypted or unencrypted format, and decryption keys for some or all of the media content items are also stored. The media content cache can also store metadata about media content items such as title, artist name, album name, length, genre, mood, or era. The media content cache can also store playback state information about the media content items, such as the number of times the user has requested to playback the media content item or the current location of playback. The playback state can further include data regarding playback status (e.g., playing, paused, stopped), a status changed timestamp describing the time when the playback status last changed, an identifier of a current media content item (e.g., a uniform resource identifier thereof), a media content item type of the current media content item (e.g., music, podcast, audiobook, or movie), a device on which the media content item was played (e.g., a phone, tablet, laptop, vehicle device, or smart speaker), and a state associated with playback of the media content item (e.g., driving, running, or studying).

The media-playback device memory device 124 typically includes at least some form of computer-readable media. Computer-readable media includes any available media that can be accessed by the media-playback device 100. By way of example, computer-readable media include computer-readable storage media and computer-readable communication media.

Computer-readable storage media includes volatile and nonvolatile, removable and non-removable media implemented in any device configured to store information such as computer-readable instructions, data structures, program modules, or other data. Computer-readable storage media includes, but is not limited to, random access memory, read only memory, electrically erasable programmable read only memory, flash memory and other memory technology, compact disc read only memory, BLU-RAY discs, DVD discs, other optical storage, magnetic cassettes, magnetic tape, magnetic disk storage or other magnetic storage devices, or any other medium that can be used to store the desired information and that can be accessed by the media-playback device 100. In some examples, computer-readable storage media is non-transitory computer-readable storage media.

Computer-readable communication media typically embodies computer-readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer-readable communication media includes wired media such as a wired network or direct-wired connection, and wireless media such as acoustic, radio frequency, infrared, and other wireless media. Combinations of any of the above are also included within the scope of computer-readable media.

In an example, the media-playback device 100 has the one or more media-playback device processing devices 122 coupled to the media-playback device memory device 124 storing media-playback device instructions which when executed cause the one or more media-playback device processing devices 122 to perform one or more operations described herein.

The content output device 128 operates to output media content. In some examples, the content output device 128 provides media output for a user. In some examples, the content output device 128 provides media output to another device, such as wireless speaker. Examples of the content output device 128 include a speaker assembly having one or more speakers, an audio output jack, a BLUETOOTH® transmitter, a display panel, and a video output jack. Other examples are possible as well, such as transmitting a signal through the audio output jack or BLUETOOTH® transmitter to reproduce an audio signal by a connected or paired device such as headphones, speaker system, or vehicle head unit.

The network access device 130 operates to communicate with other computing devices over one or more networks, such as the network 140. Examples of the network access device include one or more wired network interfaces and wireless network interfaces. Examples of wireless network interfaces include infrared, BLUETOOTH® wireless technology, WI-FI®, 802.11a/b/g/n/ac, and cellular or other radio frequency interfaces.

In some examples, the media-playback device 100 includes a movement-detecting device that senses movement of the media-playback device 100, acceleration of the media-playback device 100, determines an orientation of the media-playback device 100, or includes other detecting devices. In at least some examples, the detecting devices include one or more accelerometers or other motion-detecting technologies or orientation-detecting technologies.

In some examples, the media-playback device 100 includes a media-playback engine 132 that operates on the media-playback device 100. For instance, the media-playback engine 132 can be a media-playback software application. The media-playback engine 132 selects and plays back media content and generates interfaces for selecting and playing back media content items. In some examples, a user can interact with the media-playback engine 132 over the user interface 110. In examples, the media-playback engine 132 obtains one or more media content items from the media delivery server. In examples, the media content items are streamed from the media-delivery system 800. In other examples, the media content items are downloaded to the media-playback device 100 for later playback.

Network

The network 140 is an electronic communication network that facilitates communication at least between the media-playback device 100 and the media-delivery system 800. An electronic communication network includes a set of computing devices and links between the computing devices. The computing devices in the network use the links to enable communication among the computing devices in the network. The network 140 can include routers, switches, mobile access points, bridges, hubs, intrusion detection devices, storage devices, standalone server devices, blade server devices, sensors, desktop computers, firewall devices, laptop computers, handheld computers, mobile telephones, vehicular computing devices, and other types of computing devices.

In various examples, the network 140 includes various types of links. For example, the network 140 includes wired and/or wireless links, including BLUETOOTH®, ultra-wideband (UWB), 802.11, ZIGBEE®, cellular, and other types of wireless links. Furthermore, in various examples, the network 140 is implemented at various scales. For example, the network 140 is implemented as one or more vehicle area networks, local area networks (LANs), metropolitan area networks, subnets, wide area networks (such as the Internet), or can be implemented at another scale. Further, in some examples, the network 140 includes multiple networks, which may be of the same type or of multiple different types.

Media-Delivery System

The media-delivery system 800 includes one or more computing devices and provides media content items to the media-playback device 100 and, in some examples, other media-playback devices as well. In the illustrated example, the media-delivery system 800 includes a media content server 810. Although FIG. 8B shows a single instance of the media content server 810, some examples include multiple servers. In these examples, each of the multiple servers may be identical or similar and may provide similar functionality (e.g., to provide greater capacity and redundancy, or to provide services from multiple geographic locations). Alternatively, in these examples, some of the multiple servers may perform specialized functions to provide specialized services (e.g., natural language processing or selecting media content items, etc.). Various combinations thereof are possible as well. The media-delivery system 800 includes a natural language understanding system 870, which can be used to, for example, understand and respond to vocal commands.

The media content server 810 transmits stream media to media-playback devices, such as the media-playback device 100. In some examples, the media content server 810 includes a media server application 814, one or more media content server processing devices 854, a media content server memory device 856, and a media content server network access device 862.

In some examples, the media server application 814 streams music or other audio, video, or other forms of media content. The media server application 814 includes a media stream service 824, a media data store 826, and a media application interface 828. The media stream service 824 operates to buffer media content such as media content items 836, 838, and 840, for streaming to one or more streams 830, 832, and 834.

The media application interface 828 can receive requests or other communication from media-playback devices or other systems, to retrieve media content items from the media content server 810. For example, the media application interface 828 receives communication from the media-playback engine 132 of the media-playback device 100.

In some examples, the media data store 826 stores media content items 842, metadata 844, and playlists 846. The media data store 826 may store one or more databases and file systems, such as the example set of data structures illustrated and described in relation to FIG. 8. As noted above, the media content items 842 may be audio, video, or any other type of media content, which may be stored in any format for storing media content.

The account data store 848 is used to identify users. In an example, the account data store 848 is used to identify users of a media streaming service provided by the media-delivery system 800. In some examples, the media-delivery system 800 authenticates a user via data contained in the account data store 848 and provides access to resources (e.g., media content items 842, playlists 846, etc.) to a device operated by a user. In some examples, different devices log into a single account and access data associated with the account in the media-delivery system 800. User authentication information, such as a username, an email account information, a password, and other credentials, can be used for the user to log into his or her user account. A device can use stored credentials to log a user into the account on a device.

The media data store 826 includes user tastes data 850. The user tastes data 850 includes but is not limited to user preferences regarding media content items, such as media content items that the user likes/dislikes, media content item qualities that the user likes/dislikes, historical information about the user's consumption of media content, libraries of media content items, and playlists of media content items, among other user data.

The metadata 844 operates to provide various information associated with the media content items 842. In some examples, the metadata 844 includes one or more of title, media content type, artist name, album name, length, genre, mood, era, acoustic fingerprints, and other information. The playlists 846 operate to identify one or more of the media content items 842 and in some examples, the playlists 846 identify a group of the media content items 842 in a particular order. In other examples, the playlists 846 merely identify a group of the media content items 842 without specifying a particular order. Some, but not necessarily all, of the media content items 842 included in a particular one of the playlists 846 are associated with a common characteristic such as a common genre, mood, or era. The playlists 846 can include user-created playlists, which may be available to a particular user, a group of users, or to the public.

In some examples, the media server application 814 or a dedicated access management server provides access management services. In examples, the media server application 814 exposes application programming interface endpoints usable by calling devices or functions to use access management services, such as services for logging in to an account, obtaining credentials associated with an account, generating credentials associated with an account, and other services.

Although in FIG. 8 only a single media-playback device 100 and media-delivery system 800 are shown, in accordance with some examples, the media-delivery system 800 supports the simultaneous use of devices, and the media-playback device 100 and other devices can simultaneously access media content from multiple media-delivery systems 800. Additionally, although FIG. 8 illustrates a streaming media-based system for media playback, other examples are possible as well. For example, in some examples, the media-playback device 100 includes a media data store and the media-playback device 100 selects and plays back media content items without accessing the media-delivery system 800. Further in some examples, the media-playback device 100 operates to store previously-streamed media content items in a local media data store (e.g., in a media content cache).

In at least some examples, the media-delivery system 800 streams, progressively downloads, or otherwise communicates music, other audio, video, or other forms of media content items to the media-playback device 100 for later playback. In accordance with an example, the user interface 110 receives a user request to, for example, select media content for playback on the media-playback device 100.

Experiment

The inventors conducted an experiment and observed strong associations between diversity, relevance, and extent of user satisfaction based on the techniques described herein. The inventors further investigated how the different rankers and diversity methods presented herein fare, in terms of key satisfaction and diversity metrics. The investigation related to how algorithmic recommendations relate to content diversity, and conduct largescale analyses and experiments on the music streaming platform SPOTIFY®, an ideal platform for the investigation.

The experiment used a dataset from SPOTIFY®, a large online music streaming service. The dataset included the listening history over a two month period of a sample of one million of users across twenty million sessions. All users in the sample dataset had at least five listening sessions, whereas all sessions have at least five tracks. The users were split randomly into a training, validation, and testing set (corresponding to 85%, 7.5%, and 7.5%). User satisfaction was measured with the served recommendations using hitrate, which corresponds to the percentage of recommendations relevant to the user (recommendations that the user fully listens to without skipping). For diversity-centric experiments, the inventors considered the average popularity of the recommended content (Popularity) and average user-track similarity for recommended tracks (user-track similarity) as diversity metrics. To keep users engaged in the session from the start, providing highly relevant initial recommendations can be useful. Therefore, given the sequential nature of the problem, the inventors employed a seed song based approach, wherein the first track is selected based on relevance, and the diversity metrics are computed on the subsequent recommended tracks. Higher values of hitrate indicate greater satisfaction, while lower values of popularity and user-track similarity indicate more diversity in the served recommendations. Rankers were evaluated on the top ten recommendations they provide. To have a large and potentially diverse pool of tracks to recommend, the inventors based the evaluation only on sessions with at least twenty-five tracks.

The neural rankers were tuned by choosing batch sizes within {128, 256, 512}, and learning rate from {0.001, 0.0005, 0.0001}. All hidden layers were fixed to fifty neurons, and LSTM sizes of fifty were used. For the feed forward and feedback aware rankers, a batch size of 256 and learning rate of 0.0005 was optimal. For the reinforcement learning ranker, a batch size of 512 and learning rate of 0.0001, was optimal. For the training the reinforcement learning ranker, as we only have access to logged data, which does not have any propensity scores to allow for offpolicy techniques, we use the logged data from a simulator following from Liebman, *Dj-mc: A reinforcement-learning agent for music playlist recommendation*, PROCEEDINGS OF THE 2015 INTERNATIONAL CONFERENCE ON AUTONOMOUS AGENTS AND MULTIAGENT SYSTEMS (INTERNATIONAL FOUNDATION FOR AUTONOMOUS AGENTS AND MULTIAGENT SYSTEMS), 591-599 (2015) and Zhao, *Recommendations with negative feedback via pairwise deep reinforcement learning*, PROCEEDINGS OF THE 24TH ACM SIGKDD INTERNATIONAL CONFERENCE ON KNOWLEDGE DISCOVERY & DATA MINING (ACM), 1040-1048 (2018). In the simulation setup, the pool of available tracks is limited to what was originally recommended to the user in a session, and that the user's relevance feedback is the same no matter the order in which the reinforcement learning ranker presents the tracks.

The inventors begin by investigating the trade-off between model complexity and performance, and investigate how the different rankers fare on diversity metrics when not optimized explicitly for diversity. Table II shows the performance of the four rankers on satisfaction and diversity metrics. The hitrate for the rankers follows their computational complexity. The cosine ranker is very simple and has the lowest hitrate, while the proposed reinforcement learning ranker gives a performance boost of 1.5% compared to the cosine ranker. Overall, the inventors observed a relatively close difference in hitrate performance from the best to worst ranker. The feed forward ranker is a relatively simple pointwise ranker, which does not have access to any previous user feedback. In the feedback aware model, incorporating the user history gives a small increase in hitrate, but at the cost of significantly increasing computational complexity due to using RNNs over the user's past sessions. Lastly, the reinforcement learning model is able to obtain the highest hitrate. As the increasingly complex rankers lead to higher hitrate, they also result in recommendations with a higher average popularity. Most notably, the largest popularity increase occurs when going from the cosine ranker to any of the neural rankers, whereas the popularity difference between the neural rankers is negligible in comparison. For the user-track similarity diversity metric, the cosine ranker will by definition have the largest user-track similarity. However, among the three neural rankers, we observe that the more complex models lead to recommendations that are more similar to what the user has previously encountered. These results suggest that while increased model complexity gives better user consumption predictability, it comes at a cost of decreased diversity; the better the ranker, the worse the diversity it introduces into its recommendations.

21

TABLE II

| Ranker | Hitrate | Popularity | User-Track Similarity |
|---|---|---|---|
| Cosine | 56.006% | 1.741 | 0.584 |
| Feed Forward | 57.147% | 1.817 | 0.520 |
| Feedback Aware | 57.436% | 1.812 | 0.530 |
| Reinforcement Learning | 57.520% | 1.820 | 0.537 |

To evaluate the four diversity methods, we compare their performance for introducing diversity against each other, keeping the ranker fixed. For the three methods requiring a track relevance score (interpolation, submodular, and interleaving) we use the feedback aware ranker as the base ranker. These three methods are compared directly against the RL ranker, which is optimized for both relevance and diversity through its reward definition. As optimizing for both relevance and diversity is a trade-off, the results are presented using scatter plots. For the non-reinforcement-learning methods, the trade-off parameter α was chosen as α ∈ {0.05, . . . , 0.5} with increments of 0.05. For the reinforcement learning ranker, α was chosen as α ∈ {0.1, . . ., 0.5} with increments of 0.1, and train each configuration twice to explore the variance.

Figure 9A:
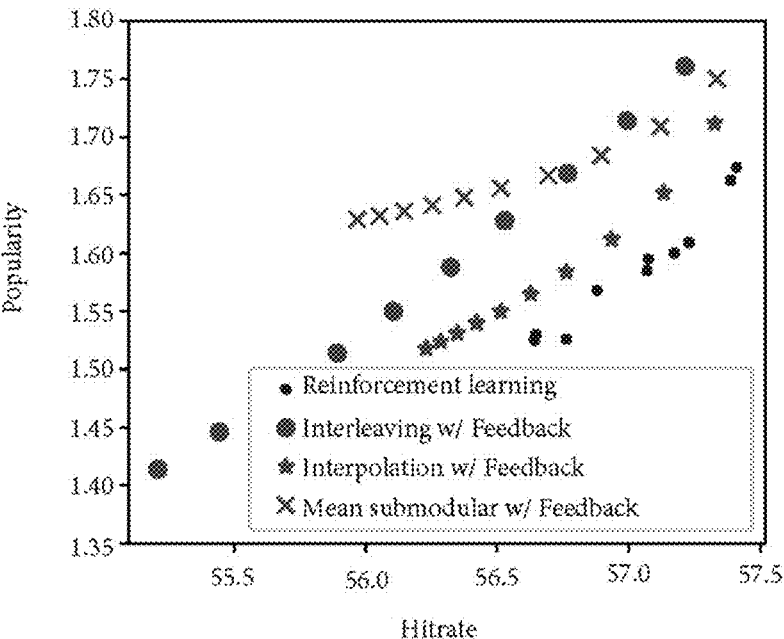
FIG. 9, which is made up of FIGS. 9A and 9B, illustrates popularity and user-track similarity versus hitrate using a feedback aware ranker.
Figure 9B:
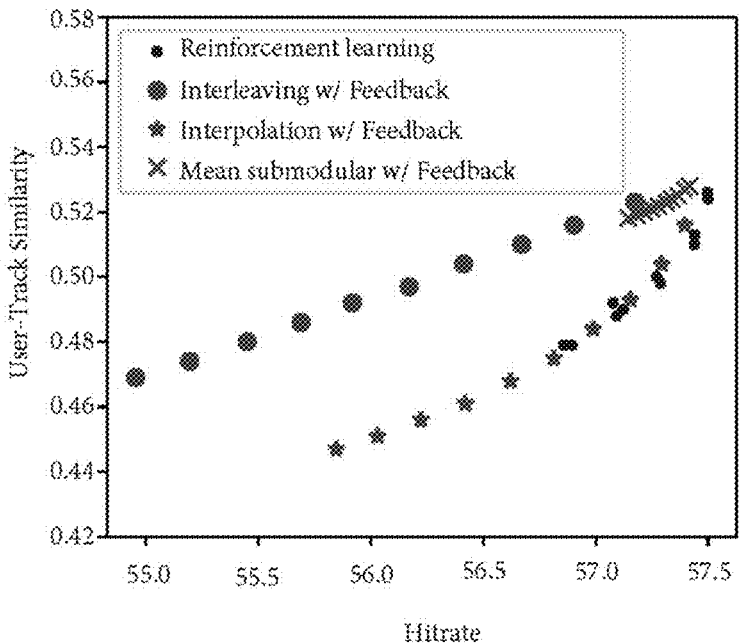

FIG. 9, which is made up of FIGS. 9A and 9B, shows results. FIG. 9A shows the trade-off between hitrate and popularity for the diversity methods. We observe that the reinforcement learning method obtains the best trade-off between high hitrate while reducing the average popularity. Linear interpolation obtains the second best trade-off, and interleaving obtains low average popularity at the cost of large reductions in hitrate. Submodular is unable to obtain any large decrease in the average popularity, as larger a values only leads to marginally drops in average popularity. Overall, these results shows a small benefit of using reinforcement learning to reduce the average popularity, but at the cost of higher computational complexity and training time compared to the simple linear interpolation.

FIG. 9B shows the trade-off between hitrate and the average user-track similarity for the diversity methods. The reinforcement learning method and linear interpolation obtain very similar trade-offs, but that the linear interpolation cover a wider range of trade-offs than the reinforcement learning method. Diversity by the submodular method results in the worst trade-offs, as the effective user-track similarity reduction is very limited. Similar to the popularity diversity metric, we observe that the interleaving method perform significantly worse than linear interpolation, and the hitrate difference for a fixed average user-track similarity is notably larger than for the popularity diversity metric. Overall, these findings suggest that leveraging reinforcement learning reward modeling for diversification gives slightly better performance, but interpolation based methods offer a wider range of trade-offs, which provides more flexibility and control to system designers.

So far rankers are compared on satisfaction metric, and the effect of the four diversity methods when the ranker was fixed were investigated. A natural question to answer is whether the observed trends in diversity methods generalize across all rankers, or does specific diversity methods work with specific rankers. Next the interplay of rankers and diversity methods is investigated. For these experiments the same choice of a values as done previously is made.

Figure 10A:
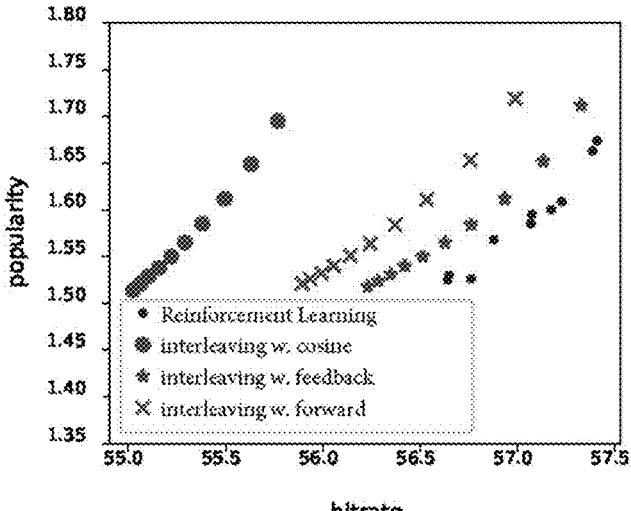
FIG. 10, which is made up of FIGS. 10A, 10B, and 10C, illustrates a popularity versus hitrate when varying the ranker within each of a choice of diversity method.
Figure 10B:
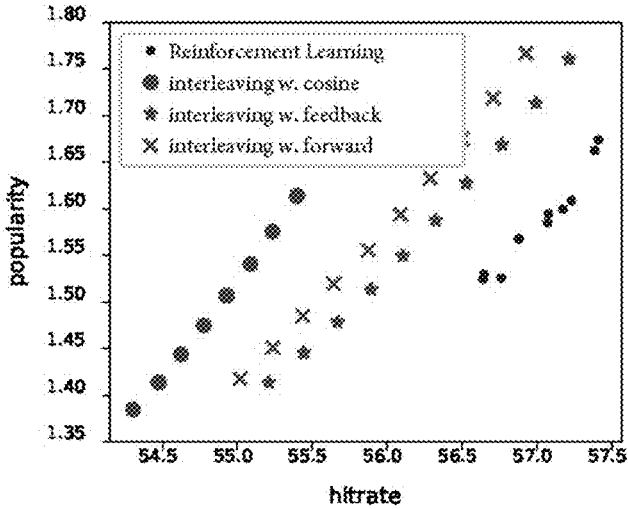
Figure 10C:
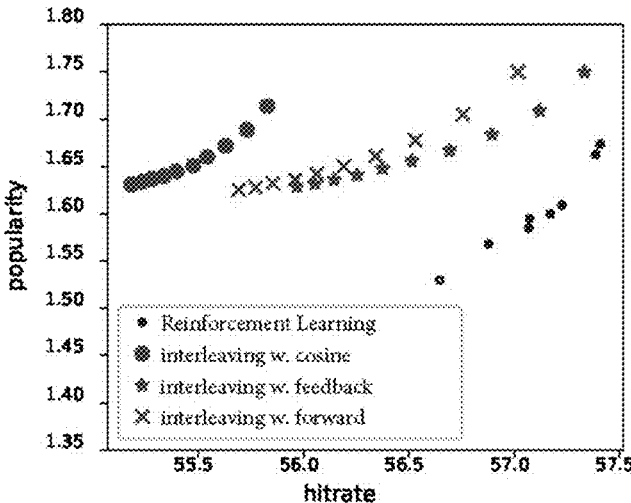

FIG. 10 shows the trade-off between average popularity and hitrate for all combinations of rankers and methods for introducing diversity. In all cases, the reinforcement learning ranker is the same and is used as a reference between the plots. The difference in hitrate from the rankers carries almost directly over for the interpolation and interleaving, while the difference is smaller between the hitrate for the submodular method. Independently of the ranker, the span of average popularity for each of the three diversity methods is approximately the same, showing that the ranker almost entirely influences the hitrate. As the average popularity decreases, we generally observe that the hitrate differences get comparatively smaller than for larger average popularity values. Independent of the ranker choice, we observe that linear interpolation obtains the best trade-off among the non-reinforcement-learning diversity methods, while reinforcement-learning obtains the best overall trade-off.

Figure 11A:
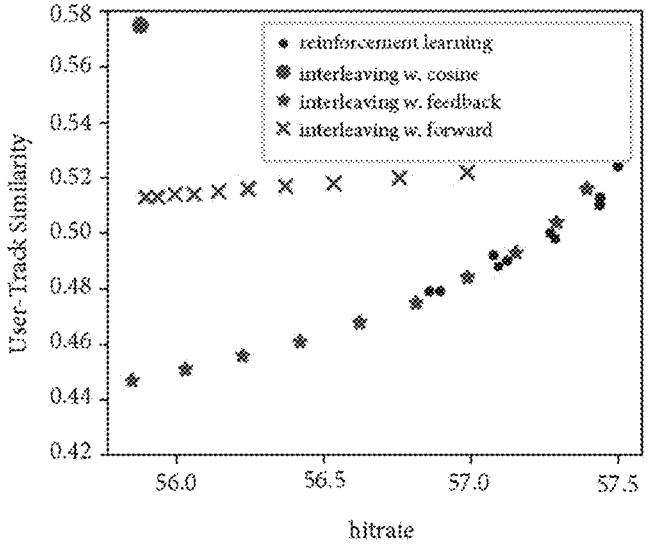
FIG. 11, which is made up of FIGS. 11A, 11B, and 11C, illustrates average user-track similarity versus hitrate when varying the ranker within each choice of diversity method.
Figure 11B:
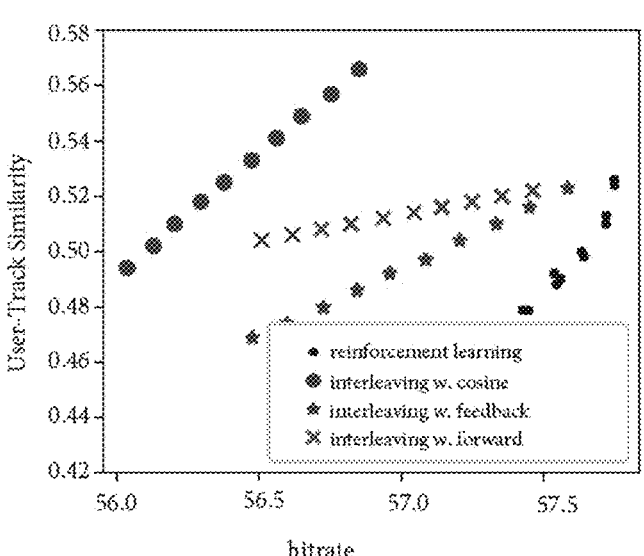
Figure 11C:
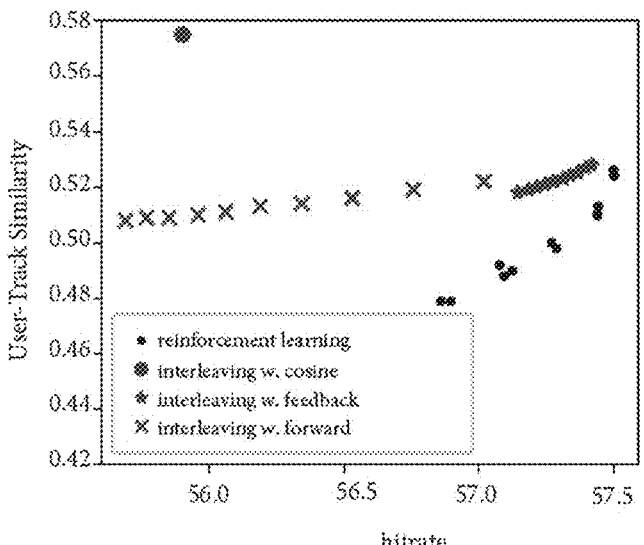

FIG. 11 shows the trade-off between average user-track similarity and hitrate for all combinations of rankers and diversity methods. Due to how linear interpolation and submodular both use the diversity metric to subtract from the rank score, they do not work when the diversity metric is the same as the relevance score (as is the case for the cosine), and all values of α therefore leads to the same ranking. The submodular method again provides the worst trade-offs out of all the diversity methods. When the feed forward ranker is used, the hitrate decrease is notably larger than for the feedback aware ranker, but the effective span of average user-track similarity values is very small for both rankers. For both linear interpolation and interleaving, we observe the difference in hitrate between the feed forward ranker and feedback aware ranker is much greater than the difference observed when only optimizing relevance. While the difference in hitrate between the feed forward and feedback aware ranker is only 0.29 when diversity is not considered (see Table II, above), the difference in hitrate can be over 1 depending on the average user-track similarity. This is even though the feedback aware ranker has a slightly higher average user-track similarity when diversity is not considered. Thus, we observe that the choice of ranker can interact with the choice of diversity method non-trivially. Overall, reinforcement learning and linear interpolation work better than interleaving and submodular diversity methods, with both reinforcement learning and interleaving with feedback aware ranker obtaining approximately the same trade-offs, while the linear interpolation covering a larger span of average user-track similarities. More interestingly, comparing these results with the ranker comparison on only satisfaction, there are bigger differences in hitrate when rankers consider diversity, than when they are only focused on satisfaction. This suggests that when one cares only about satisfaction, there exist little difference between the rankers; however when one cares additionally about diversity, the difference between rankers becomes more pronounced. Given the varying complexity of development and deployment of these rankers, this result has big ramifications on the choice of rankers for system designers based on the task at hand.

While various examples of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents. Further, the Abstract is not intended to be limiting as to the scope of the example embodiments presented herein in any way. It is also to be understood that the procedures recited in the claims need not be performed in the order presented.

What is claimed is:

1. A method for selecting a media content item, the method comprising:

obtaining first embedding data describing media content items from previous content consumption sessions of a user account, wherein the first embedding data is based on a weighting of session representations from the previous content consumption sessions;

obtaining second embedding data regarding media content items previously recommended during a current content consumption session of the user account;

obtaining third embedding data describing a potential media content item;

providing, to a reinforcement learning model, the first embedding data, the second embedding data, and the third embedding data, wherein the reinforcement learning model produces a score, wherein the score is based on: a relevance of features of the potential media content item with respect to the user account, and a diversity of the potential media content item with respect to the user account, and wherein the diversity is weighted by the relevance and a weighting factor; and selecting, for the user account, the potential media content item based on the score, wherein the potential media content item is selected for playback to a device associated with the user account.

2. The method of claim 1, wherein the potential media content item is an audio track.

3. The method of claim 1, wherein the diversity is based on a dissimilarity of the potential media content item with respect to media content items from the previous content consumption sessions.

4. A non-transitory computer-readable medium having instructions stored thereon that, when executed by one or more processors, cause the one or more processors to:

obtain first embedding data describing media content items from previous content consumption sessions of a user account, wherein the first embedding data is based on a weighting of session representations from the previous content consumption sessions;

obtain second embedding data regarding media content items previously recommended during a current content consumption session of the user account;

obtain third embedding data describing a potential media content item;

provide, to a reinforcement learning model, the first embedding data, the second embedding data, and the third embedding data, wherein the reinforcement learning model produces a score, wherein the score is based on: a relevance of features of the potential media content item with respect to the user account, and a diversity of the potential media content item with respect to the user account, and wherein the diversity is weighted by the relevance and a weighting factor; and select, for the user account, the potential media content item based on the score, wherein the potential media content item is selected for playback to a device associated with the user account.

5. A media-delivery system comprising:

one or more processors;

memory; and program instructions, stored in the memory, that upon execution by the one or more processors cause the media-delivery system to perform operations comprising:

obtain first embedding data describing media content items from previous content consumption sessions of a user account, wherein the first embedding data is based on a weighting of session representations from the previous content consumption sessions;

obtain second embedding data regarding media content items previously recommended during a current content consumption session of the user account;

obtain third embedding data describing a potential media content item;

provide, to a reinforcement learning model, the first embedding data, the second embedding data, and the third embedding data, wherein the reinforcement learning model produces a score, wherein the score is based on: a relevance of features of the potential media content item with respect to the user account, and a diversity of the potential media content item with respect to the user account, and wherein the diversity is weighted by the relevance and a weighting factor;

select, for the user account, the potential media content item based on the score; and transmit the potential media content item to a media-playback device for playback.

6. The media-delivery system of claim 5, wherein the diversity is based on a dissimilarity of the potential media content item with respect to media content items from the previous content consumption sessions.

7. The method of claim 1, wherein the reinforcement learning model applies a long short-term memory (LSTM) layer to the first embedding data and the second embedding data to produce an output, and wherein the reinforcement learning model applies a softmax function to a concatenation of the output and the third embedding data to produce the score.

8. The method of claim 7, wherein the LSTM layer comprises a stacked LSTM initialized based on a session meta feature relating to a combination of the first embedding data and data related to the user account.

9. The non-transitory computer-readable medium of claim 4, wherein the reinforcement learning model applies a long short-term memory (LSTM) layer to the first embedding data and the second embedding data to produce an output, and wherein the reinforcement learning model applies a softmax function to a concatenation of the output and the third embedding data to produce the score.

10. The non-transitory computer-readable medium of claim 9, wherein the LSTM layer comprises a stacked LSTM initialized based on a session meta feature relating to a combination of the first embedding data and data related to the user account.

11. The media-delivery system of claim 5, wherein the reinforcement learning model applies a long short-term memory (LSTM) layer to the first embedding data and the second embedding data to produce an output, and wherein the reinforcement learning model applies a softmax function to a concatenation of the output and the third embedding data to produce the score.

12. The media-delivery system of claim 11, wherein the LSTM layer comprises a stacked LSTM initialized based on a session meta feature relating to a combination of the first embedding data and data related to the user account.

13. The method of claim 1, further comprising:

transmitting the potential media content item to the device for the playback.

14. The non-transitory computer-readable medium of claim 4, wherein the instructions, when executed by the one or more processors, further cause the one or more processors to:

transmit the potential media content item to the device for
  the playback.

\*   \*   \*   \*   \*